United States Patent [19]

Watanabe

[11] Patent Number: 4,638,331

[45] Date of Patent: Jan. 20, 1987

[54] IMAGE BUILDING APPARATUS

[75] Inventor: Junji Watanabe, Yokohama, Japan

[73] Assignee: Kabushiki Kaisha Toshiba, Kawasaki, Japan

[21] Appl. No.: 758,750

[22] Filed: Jul. 25, 1985

[30] Foreign Application Priority Data

Jul. 27, 1984 [JP] Japan ................................ 59-156718

[51] Int. Cl.[4] ............................................ G01D 15/10

[52] U.S. Cl. ............................... 346/76 PH; 346/106; 400/120; 400/224.2; 400/240.4

[58] Field of Search ........................... 346/76 PH, 106; 400/120, 224.1, 224.2, 240.3, 240.4; 214/216 PH

[56] References Cited

U.S. PATENT DOCUMENTS 3,861,305 1/1975 Sasaki .................................. 101/336

4,540,991 9/1985 Kuriya et al. .................. 346/76 PH 4,547,783 10/1985 Watanabe ...................... 346/76 PH

*Primary Examiner*—Arthur G. Evans

*Attorney, Agent, or Firm*—Schwartz, Jeffery, Schwaab, Mack, Blumenthal & Evans

[57] ABSTRACT

An image building apparatus of the type in which both a sheet of printing medium and a strip of ink donor medium are displaced in the superimposed state in an area defined between a printing head and a platen. The printing head thermally transfers a coloring agent on the ink donor medium to the printing medium. The width of ink donor medium is fabricated to be less than the width of printing medium. A pair of retaining members are disposed at both ends of the printing medium as seen in the transverse direction whereby the exposed parts of the printing medium at both the ends thereof are brought in pressure contract with the platen under the effect of thrusting force imparted by the retaining members.

7 Claims, 24 Drawing Figures

IMAGE BUILDING APPARATUS

BACKGROUND OF THE INVENTION

1. Field of the Invention

The present invention relates to an image building apparatus of the type in which both a sheet of printing medium and a strip of ink donor medium are displaced in the superimposed state in the area as defined between a printing head and a platen and thermal transferring is effected by a transferring coloring agent on the ink donor medium to the printing medium with the aid of the printing head and more particularly to an improvement of an image building apparatus of the above-mentioned type which is intended to design and construct the apparatus in smaller dimensions.

2. Description of the Prior Art

A heat sensitive ink transferring type recording apparatus with a thermal printing head serving as a printing head employed therefor is herein noted as a typical apparatus of the early mentioned type. This type of apparatus is generally constructed such that a sheet of printing medium (paper) is partially wound about the platen and an image is built on the printing medium by transferring coloring agents on a strip of ink donor medium (thermal transfer ribbon) to the printing medium with the aid of the thermal printing head while the ink donor medium is brought in pressure contact with the printing medium in the superimposed state. When multicolor transference is to be carried out, the printing medium is required to reciprocably move for each of plural coloring agents so as to effect transferring for all coloring agents.

However, it has been found that the conventional apparatus has a drawback that incorrect displacement of the printing medium away from the predetermined position takes place due to an occurrence of slippage of the printing medium along the outer surface of the platen at every time when transference is achieved for each of coloring agents while the printing medium is reciprocably displaced. To obviate the above-mentioned drawback, there is already made such a proposal that a pair of thrusting roller mechanisms are disposed at the positions located downstream and upstream of the thermal printing head as seen in the direction of transportation of the printing medium in order to assure that the printing medium is accurately displaced while it is firmly clamped between the thrusting roller mechanisms and the platen. When the pair of thrusting roller mechanisms are so constructed that they are always brought in pressure contact with the platen, it results that the printing medium is always caused to reciprocably move while it is clamped between the thrusting rollers and the platen. This leads to a problem of increasing a non-image building area on the printing medium where no image can be built (located at both the ends of the printing medium as seen in the transverse direction).

In view of the above-mentioned problem there has been lately made another proposal that a pair of thrusting rollers are so arranged that they are displaced toward and away from the platen in accordance with the reciprocable movement of the printing medium, thereby reducing the non-image building area on the printing medium. However, the apparatus according to this proposal has a problem that levers, shafts, resilient members or the like components are required and thereby the apparatus becomes has larger dimensions.

SUMMARY OF THE INVENTION

Hence, the present invention has been made with the foregoing background in mind.

It is an object of the present invention to provide an image building apparatus of the above mentioned type which assures that a mechanism for supporting a sheet of printing medium relative to the platen is designed and constructed in smaller dimensions.

It is another object of the present invention to provide an image building apparatus of the above mentioned type in which the width of the ink donor medium is appreciably less than that of the printing medium and a pair of retaining members are disposed at both ends of the printing medium whereby the printing medium is brought into pressure contact with the platen under the effect of a thrusting force imparted by the retaining members.

To accomplish the above objects there is proposed according to the invention an image building apparatus essentially comprising a platen for transporting a sheet of printing medium while the latter is partially wound about the platen, a strip of ink donor medium of a width appreciably less than the width of the printing medium, ink donor supporting and transporting means for supporting and transporting the ink donor medium which is spanned between a pair of cores while both of the end parts of the printing medium as seen in the transverse direction are exposed to the outside when the ink donor medium is brought in contact with the printing medium, a printing head adapted to be displaced toward the platen to thermally transfer coloring agent on the ink donor medium to the printing medium when the printing head comes in pressure contact with the platen with the ink donor medium and the printing medium interposed therebetween, the printing head being displaced away from the platen after completion of ink transference, a pair of retaining members disposed at the both ends of the printing medium as seen in the transverse direction to thrust the exposed parts of the printing medium at the both ends thereof against the platen under the effect of thrusting force imparted by the retaining members, and driving means for displacing the retaining members toward and away from the platen.

Other objects, features and advantages of the invention will become more clearly apparent from reading of the following description which has been prepared in conjunction with the accompanying drawings.

BRIEF DESCRIPTION OF THE DRAWINGS

The accompanying drawings will be briefly described below.

DESCRIPTION OF THE PREFERRED EMBODIMENT

Now, the present invention will be described in a greater detail hereunder with reference to the accompanying drawings which schematically illustrate an image building apparatus in accordance with an embodiment of the invention.

Figure 1:
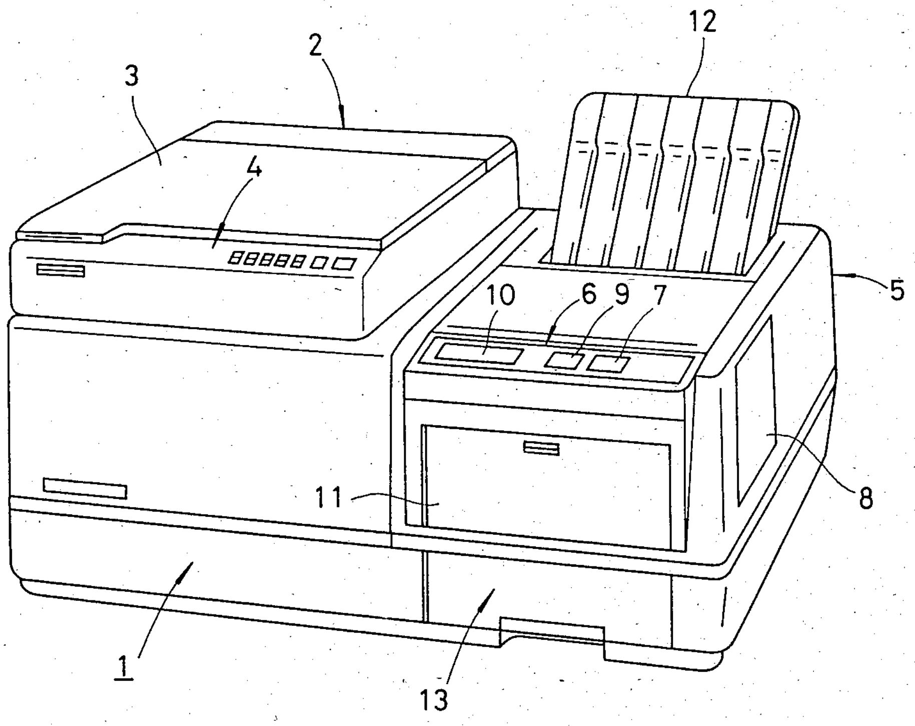
FIG. 1 is a perspective view of an image building apparatus in accordance with the invention, particularly illustrating the outer appearance of the apparatus.

FIG. 1 is a perspective view illustrating the whole appearance of the apparatus. An image information reading unit 2 is detachably mounted on the upper surface of a housing 1 of the apparatus. The image information reading unit 2 is provided with an original cover 3 adapted to be opened and closed as required by its turning movement and an original holding board (not shown) made of transparent glass is placed below the original cover 3 to hold an original thereon. The image information reading unit 2 is intended to optically scan the original on the original board by allowing a scanner section comprising a lighting system (which will be described in more details later) to reciprocably move along the bottom surface of the original board and then convert thus scanned optical information into electrical signals. A control panel 4 is disposed on the upper fore part of the image information reading unit 2. Electrical signals photoelectrically converted in the image information reading unit 2 in that way are transmitted to an image building section 5 which is removably mounted on the housing 1 at the position located rightwardly of the image information reading section 2 as seen in the drawing. Thus, a required image is built on printing medium in the form of a sheet of paper in the image building section 5 in response to thus converted signals. A control panel 6 is disposed on the upper fore part of the image building section 5. Specifically, the control panel 6 includes an on-line scanner key 7 for selecting the image information reading unit 2 on the housing 1, an eject key 9 adapted to be operated when ink donor medium in the form of a thermal transfer ribbon is taken out of the door 8 on the righthand side wall of the image building section 5 and a display 10. Further, the image building section 5 is provided with a guide section 11 on the front wall thereof which is adopted to open when paper is manually fed into the interior of the image building section 5 and moreover it is provided with a paper receiving tray 12 on the upper rear part thereof on which papers are received after completion of image transference. A paper feeding cassette 13 in which a number of papers are accommodated is detachably fitted into the housing 1 at the position located below the image building section 5.

Figure 2:
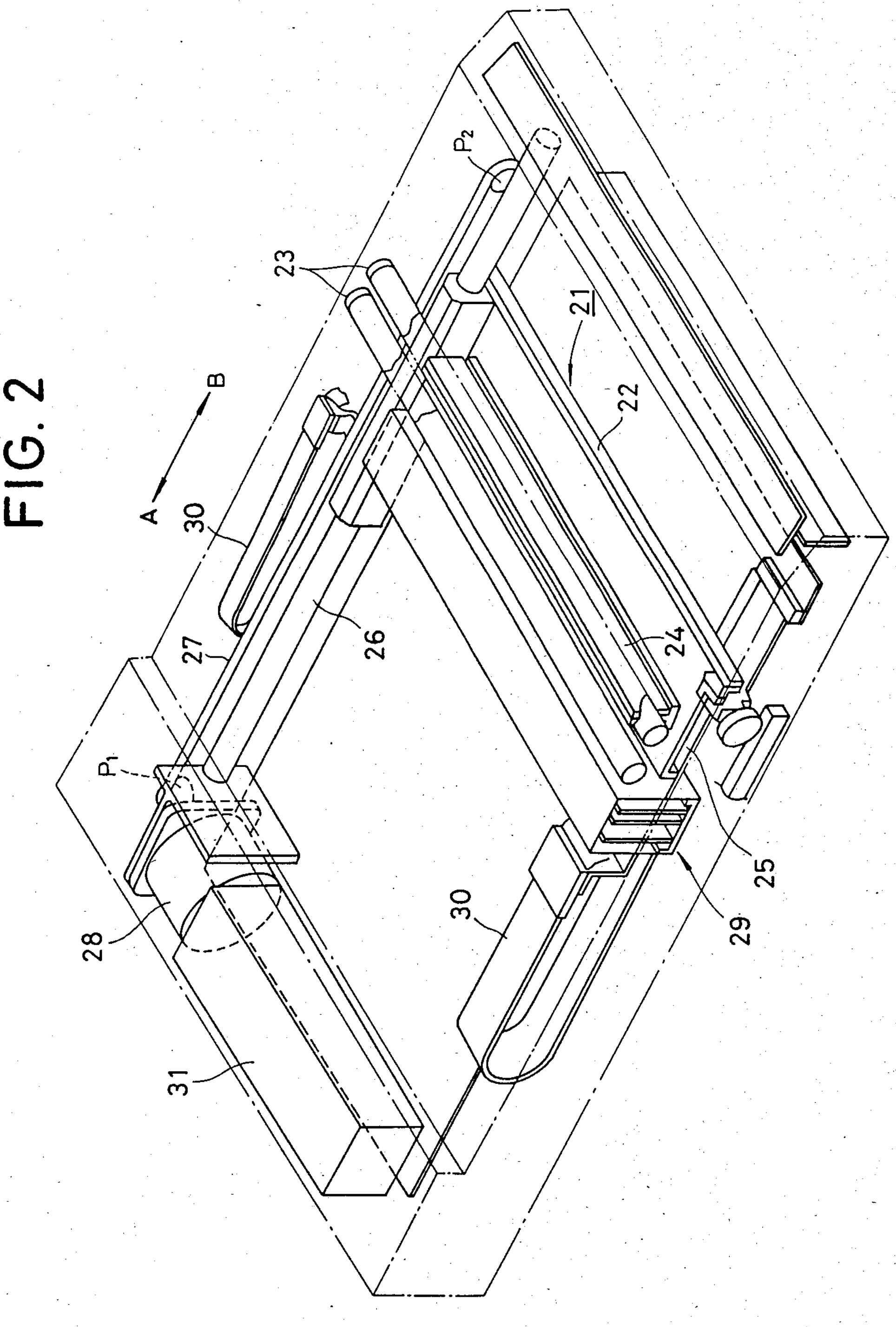
FIG. 2 is a perspective view of an image information reading unit in the apparatus of the invention.

Next, FIG. 2 is a schematic perspective view of the image information reading unit. Two light sources 23 are carried on a carriage 22 constituting the scanner section 21 in the parallel relation and two lenses 24 having the inverted V-shaped sectional configuration are attached to the light sources 23 while extending across the whole length of the latter. A photoelectric convertor 25 comprising a color CCD is disposed at the lower end of the lenses 24. As is apparent from the drawing, the carriage 22 has a guide shaft 26 at the one end part thereof which is inserted therethrough so that it slidably move on it and an endless timing belt (toothed belt) 27 extending along the guide shaft 26 in the stretched state is fixedly secured to the carriage 22. The timing belt 27 is driven by means of a pulse motor 28. Namely, the timing belt 27 is scanned between a motor pulley $P_1$ disposed on the rotational shaft of the pulse motor 28 and an idle pulley $P_2$ so that the scanner section 21 is displaced in the direction as identified by an arrow mark A or B in dependence on the direction of movement of the timing belt 27. In the drawing reference numeral 29 designates a printed base board with an A/D converting section and other components mounted thereon, the A/D converting section serving to convert output signals from the photoelectric convertor 25 into digital signals. Reference numeral 30 denotes a flat cable by way of which electricity outputted from an invertor is supplied to the light sources 23 and signals processed by circuits on the printed base board are transmitted to the image building section 5.

Figure 3:
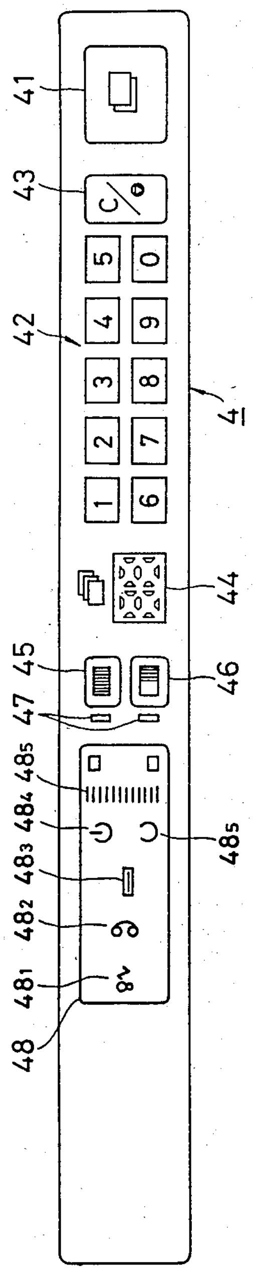
FIG. 3 is a plan view of a control panel as seen from the above.

FIG. 3 is a plan view of the control panel for the image information reading unit 2 as seen from the above. As is apparent from the drawing, the control panel 4 includes a print key 41 for commanding starting of printing operation, ten keys 42 for specifying the number of papers to be printed and other items, a clear stop key 43 for commanding the clearing of the specification of the number of papers to be printed and stopping the printing operation, a seven segment display 44 for displaying the number of papers to be printed and other items, an intermediate mode key 45 for an intermediate mode comprising a combinations of all available colors and its optical density, a two value mode key 46 for specifying one of two value modes comprising a mode corresponding to a monochromatic color and a mode corresponding to a combination of seven colors as well as their optical density, a mode display 47 for displaying a selected mode key and a display 48 for displaying a variety of items. Specifically, the last mentioned display 48 includes a jamming display portion $48_1$ adapted to be turned on in the event of an occurrence of paper jamming in the housing of the apparatus, a ribbon display portion $48_2$ for displaying various existent states relative to whether or not a ribbon is fitted into a ribbon cassette to be set in the housing 1 of the apparatus, whether or not the cassette is fitted therein or the like state, a paper display portion $48_3$ for displaying the existent state relative to whether or not the paper feeding cassette is set in position or whether papers are received in the paper feeding cassette 8, scanner display portions $48_4$ and $48_5$ for displaying the operative state of the scanner section 11 and an optical density display portion $48_6$ for displaying optical density predetermined by operation of the mode keys 45 and 46.

Figure 4:
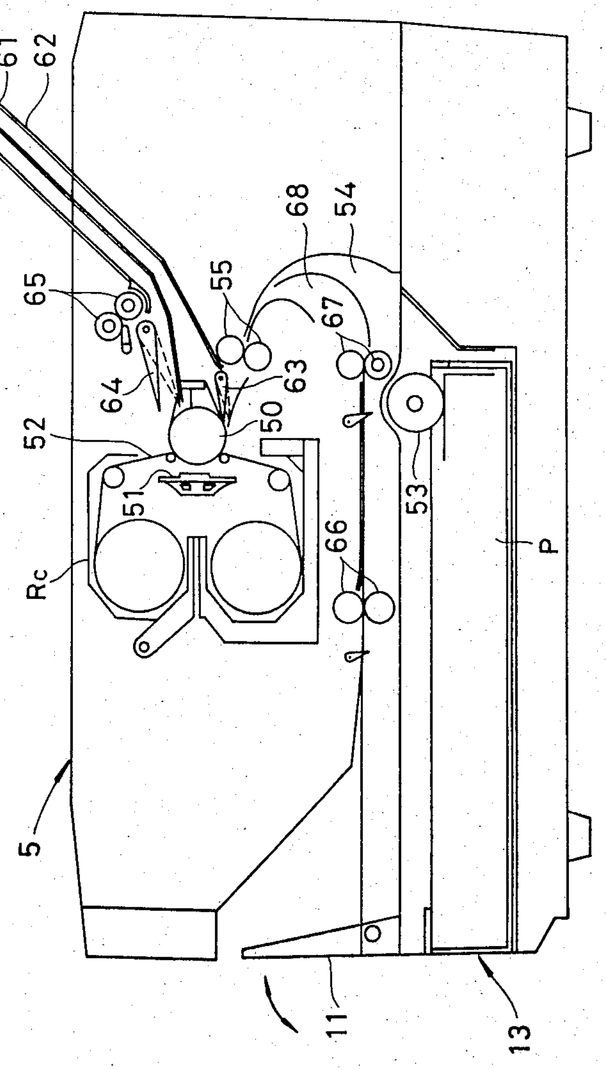
FIG. 4 is a schematic vertical sectional view of the apparatus, particularly illustrating how an image building section is constructed.

Next, the image building section 5 is constructed as illustrated by way of a vertical sectional view in FIG. 4. Specifically, a platen 50 is located at the approximately central position of the image building section 11 and a thermal head 51 serving as recording head is disposed at position located in front of the platen 50 (leftwardly of the platen 50 as seen in FIG. 4) in such a manner that it comes in contact with the latter and moves away therefrom.

It should be noted that the thermal head 51 is so located that it is accommodated in the space as defined by a ribbon cassette $R_c$ and a thermal transfer ribbon (ink ribbon) 52 is interposed between the platen 50 and the thermal head 51. While the thermal transfer ribbon 52 is interposed therebetween, paper P is thrusted against the platen 50 and ink on the thermal transfer ribbon 52 is then transferred onto paper P in the molten state by activating a number of heating elements (not shown) arranged on the thermal head 51 in the line dot shaped pattern.

As illustrated in the drawing, a paper feeding roller 53 is located below the platen 50 in order to take out one by one papers P received in the paper feeding cassette 13 as the printing medium. Thus taken paper P is brought to a pair of register rollers 55 via a paper guiding passage 54. As is apparent from the drawing, the register rollers 55 are disposed approximately above the paper feeding roller 53 so as to assure correct orientation of the leading end of paper P. Thereafter, paper P is displaced toward the platen 10 to assume the operative state where it is partially wound about the platen 50.

Figure 5:
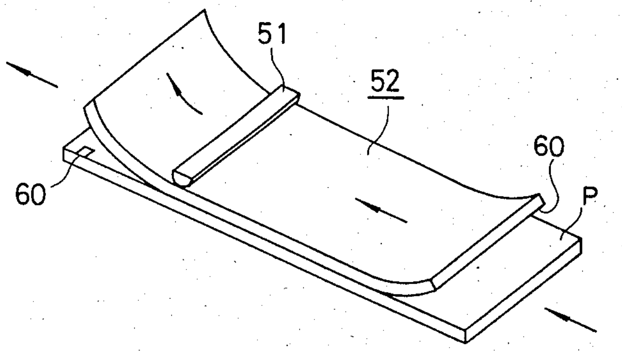
FIG. 5 is a schematic perspective view, particularly illustrating how thermal transferring operation is performed.

When paper P is partially wound about the platen 50, the thermal head 51 is displaced to thrust paper P against the platen 50 with both paper P and thermal transfer ribbon 52 interposed therebetween as schematically illustrated in FIG. 5 whereby ink 60 on the thermal transfer ribbon 52 is transferred onto paper P in the molten state.

Next, description will be made as to the thermal transfer ribbon 52 below. As typically illustrated in FIG. 6, it includes three ink sections 60*a*, 60*b* and 60*c* in the area I, wherein the ink section 60*a* is allocated to a color of yellow (Y), the ink section 60*b* is to a color of magenta (M) and the ink section is to a color of cyan (C). Alternatively, it may include four ink sections 60*a*, 60*b*, 60*c* and 60*d* arranged in the area II, wherein the ink section 60*a* is allocated to a color of yellow (Y), the ink section 60*b* is to a color of magenta (M), the ink section 60*c* is to a color of cyan (C) and the ink section 60*d* is to a color of black (B). Color transferring is effected in such a manner that paper P is restored to the initial position after completion of transference of one of all colors. Color transferring is repeatedly carried out in accordance with the predetermined order of color superimposition.

Figure 6:
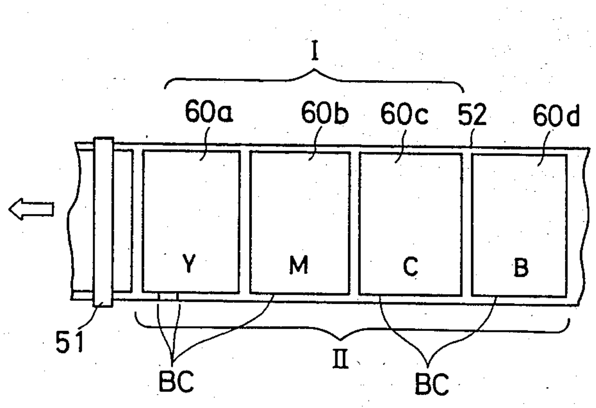
FIG. 6 is a plan view of a thermal transfer ribbon, particularly illustrating how a plurality of ink sections are arranged in the longitudinal direction.

As shown on the lower part of FIG. 6, bar code BC is attached to the lower edge of each of the color sections 60*a* to 60*d* on the thermal transfer ribbon 52 in order to identify color on each of the ink sections 60*a* to 60*d* and align the foremost end of each of the ink sections 60*a* to 60*d* with the leading end of paper P. The existence of bar code BC is detected by means of a bar code sensor (as identified by reference numeral 78 in FIG. 8) which will be described later.

Incidentally, the black ink section 60*d* is used in the case where there is a necessity for clearly exhibit a color of black. However, it should be added that a color very close to real black can be produced by superimposing three colors one above another without any use of the black ink section 60*d*.

Thus, paper P is reciprocably displaced by the number of times equal to that of colors to be printed by rotating the platen 50 in both directions. During reciprocable displacing of paper P, it is brought onto one of first and second guides 61 and 62 which are disposed below the printed paper receiving tray 12. The first guide 61 is located just below the paper receiving tray 12 and the second guide 62 is located below the first one.

Description will be made as to how paper P is reciprocably displaced below with reference to FIGS. 7 (*a*) to (*d*) each of which is a schematic fragmental vertical sectional view of the apparatus. First, paper P is taken from the paper feeding cassette 13 and it is then displaced to the platen 50 via the pair of register rollers 55 and the first distributing gate 63 so that it is partially wound about the platen 50 (see FIG. 7(*a*)).

Next, the platen 50 is rotated by means of a pulse motor (not shown) which serves as a driving power source so that paper P is transported at a predetermined speed. At this moment heating elements (not shown) arranged on the thermal head 51 in the line dot shaped pattern in the axial direction of the platen 50 are heated up in response to image information whereby ink 60 on the thermal transfer ribbon 52 is transferred onto paper P in the molten state.

Then, the leading end of paper P which has moved past the platen 50 is delivered onto the first guide 61 disposed below the paper receiving tray 12 via the second distributing gate 64 (see FIG. 7(*b*)).

After completion of transference of ink 60 having one of colors the thermal transfer ribbon 52 is displaced by a distance equal to the length of one ink section so that the rearmost end of the next ink section is aligned with the tail end of paper P. As the platen 50 is rotated in the reverse direction, thermal transferring is effected in the reverse manner and it is then delivered onto the second guide 62 disposed below the first guide 61 via the first distributing gate 63 which has been turned to the illustrated position (see FIG. 7(*c*)).

Thus, thermal transference of plural colors is achieved by reciprocably displacing paper P by plural times in the above-described manner.

Figure 7:
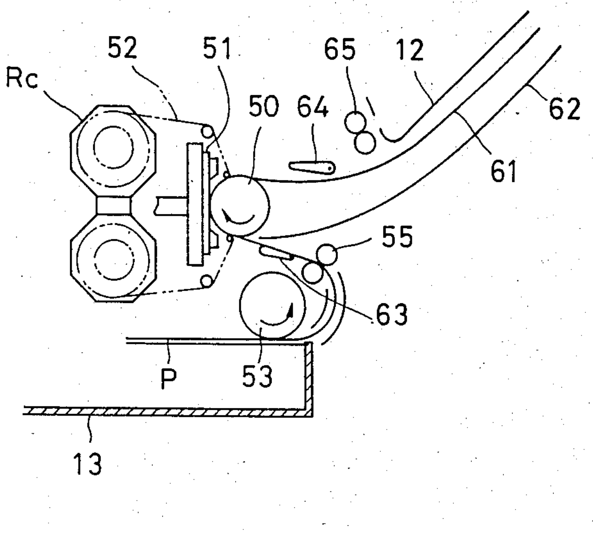
FIG. 7 (*a*) to (*d*) are a schematic fragmental vertical sectional view of the apparatus respectively, illustrating how paper is reciprocably displaced through the image building section when multi-color transferring is to be effected.
Figure 7:
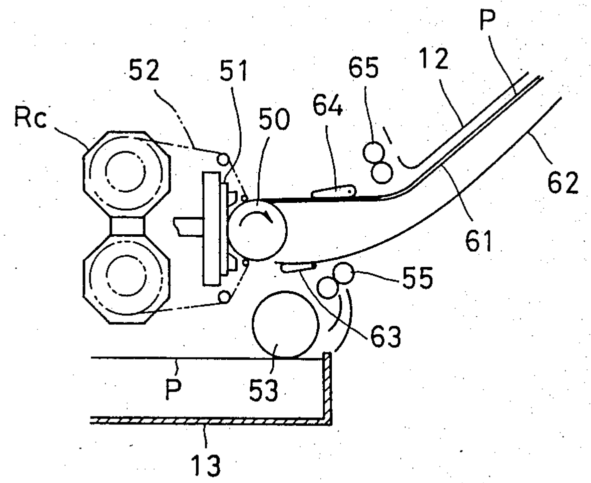
Figure 7:
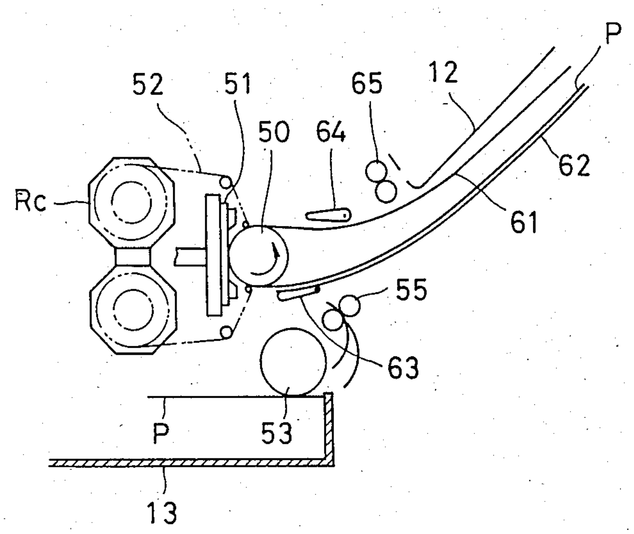
Figure 7:
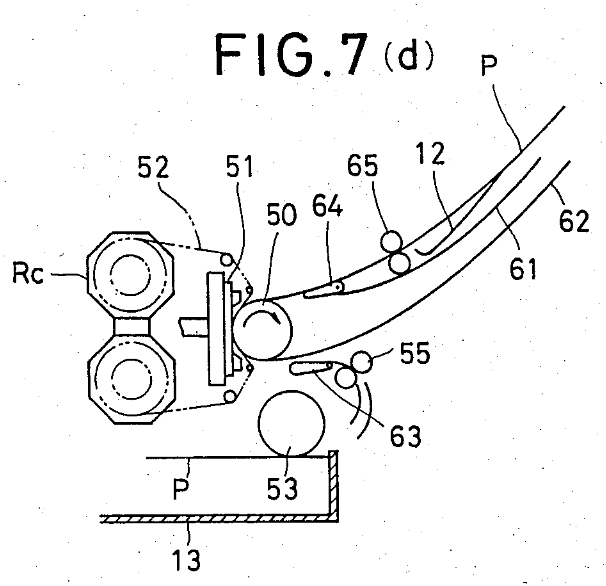

Finally, paper P onto which inks 60 of all colors have been transferred in that way is brought to a pair of discharging rollers 65 via the second distributing gate 64 and it is then discharged onto the paper receiving tray 12 by means of the paper discharging rollers 65 (see FIG. 7(*d*)).

Referring to FIG. 4 again, a pair of rollers 66 and 67 are intended to feed paper by manual operation and paper which has been transported by means of the rollers 66 and 67 is brought to the pair of register rollers 55 via a guide passage 68.

Next, description will be made below as to how the image building section 5 is constructed. Regarding to FIGS. 8 to 10, a printer block 71 is designed in the substantially same configuration as the outer configuration of the ribbon cassette Rc. A head holder 72 is adapted to support the thermal head 51 from the rear side while serving as a heat radiating plate. A pair of ribbon guides 73 are integrally secured to the head holder 72. Rods 75 are provided first ends of which are attached to the head holder 72 while the other ends are connected to driving links 74. There is further provided a rotary shaft 76 for the driving links 74, coil springs 77 adapted to turn the links 74 in the clockwise direction as seen in the drawings under the effect of their resilient force to displace the thermal head toward the platen 50 by way of the rods 75 and a bar code detector 78 comprising a light emitting element and light receiving element to detect the existence of bar code attached to the thermal transfer ribbon (ink ribbon) 52.

Figure 9:
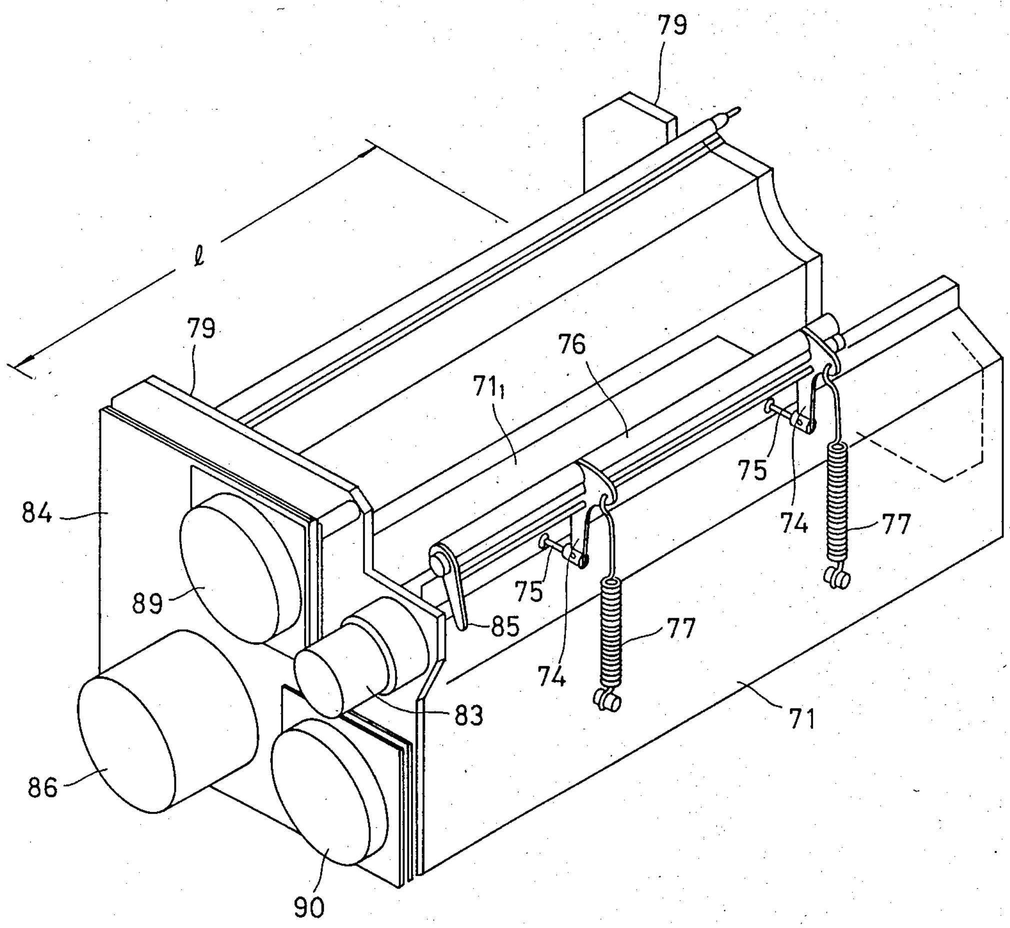
FIG. 9 is a perspective view of the image building section.
Figure 10:
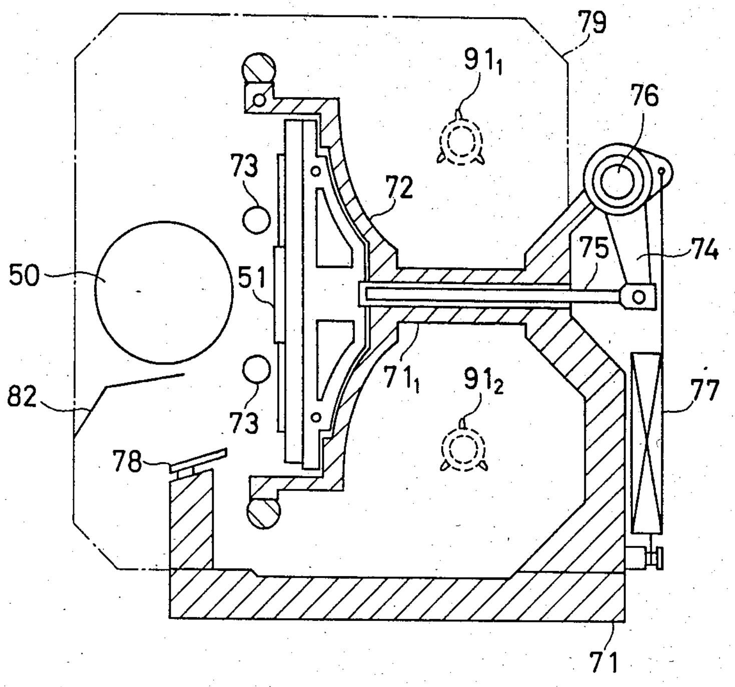
FIG. 10 is a vertical sectional side view of the image building section similar to FIG. 8 with a ribbon cassette removed therefrom.

The platen 50 is secured to both frames 79 which are attached to both the side walls of the printer block 71. As is best seen from FIG. 9, a motor 83 for driving the thermal head 51 and a motor frame 84 are fitted to one frame 79. A rotary shaft (not shown) of the motor 83 has a cam fixedly secured thereto so that the lever 85 on the rotary shaft 76 is turned by means of the cam which is rotated as the motor 83 is driven. Thus, the thermal head 51 is displaced away from the platen 50 against the resilient force of the coil springs 77. As is apparent from FIG. 9, a platen driving motor 86 and ribbon driving motors 89 and 90 for rotating cores 87 and 88 (see FIG. 8) for the thermal transfer ribbon (ink ribbon) 52 in the ribbon cassette Rc are mounted on the motor frame 84. Obviously, the motors 86, 89 and 90 are adapted to rotate the platen 50 and the cores 87 and 88 by way of gears (not shown). Among these gears the gears adapted to rotate the cores 87 and 88 are formed with engagement projections $\mathbf{91}_1$ and $\mathbf{91}_2$ at their center of rotation as illustrated in FIG. 10. Thus, it is possible to run the thermal transfer ribbon 52 in both the normal and reverse directions by controlling the motors 89 and 90.

Figure 8:
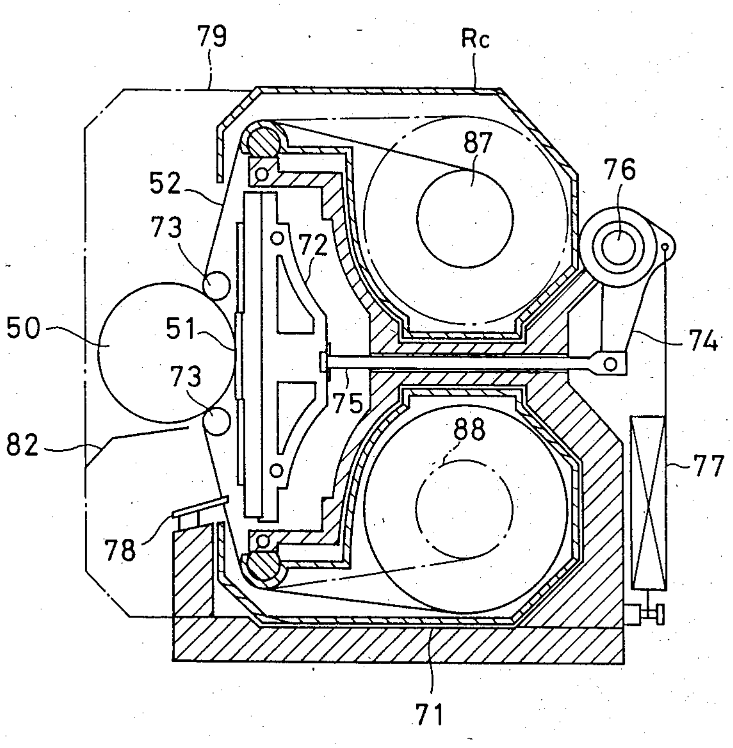
FIG. 8 is a vertical sectional side view of the image building section.
Figure 11:
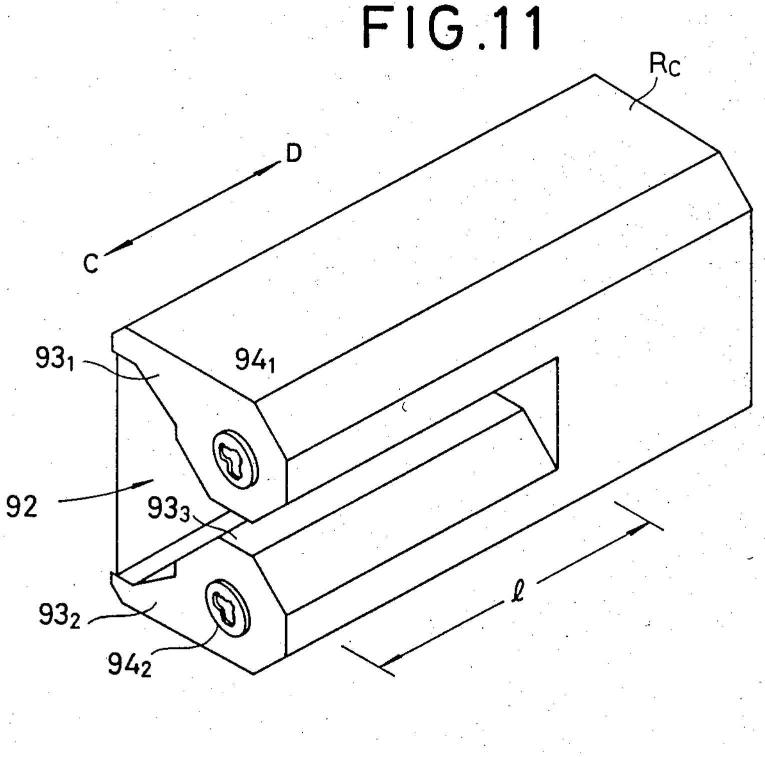
FIG. 11 is a perspective view of the ribbon cassette, particularly illustrating how it is constructed with respect to dimensions.

Further, the ribbon cassette Rc is removably fitted into the printer block 71. Specifically, the ribbon cassette Rc is designed in the substantially U-shaped sectional configuration so as to fill a hollow space 92 in the area as defined between the rear side of the exposed part of the thermal transfer ribbon 52 and the ribbon cassette Rc in which the holder 72, the ribbon guides 73 and thermal head 51 are accommodated, as illustrated in FIG. 11. Further, the ribbon cassette Rc is formed with a slit $\mathbf{93}_3$ between both core holding portions $\mathbf{93}_1$ and $\mathbf{93}_2$ so that the fitting portion $\mathbf{71}_1$ of the printer block 71 (see FIGS. 9 and 10) may be fitted into the slit $\mathbf{93}_3$. The depth of the slit $\mathbf{93}_3$ is fabricated to be substantially the same as the length l of the fitting portion $\mathbf{71}_1$. In the illustrated embodiment the length l of the fitting portion $\mathbf{71}_1$ is determined to be more than a half of the width of the thermal transfer ribbon 52. Thus, the ribbon cassette Rc can be fitted to the printer block 71 or can be removed therefrom by displacing the ribbon cassette Rc relative to the printer block 71 in the longitudinal direction (in the direction as identified by an arrow mark D or C in FIG. 11). Further, engagement recesses $\mathbf{94}_1$ and $\mathbf{94}_2$ which are operatively associated with the cores 87 and 88 in both the core holding portions $\mathbf{93}_1$ and $\mathbf{93}_2$ are provided on the front side walls of the latter whereby the engagement projections $\mathbf{91}_1$ and $\mathbf{91}_2$ are brought into engagement with the engagement recesses $\mathbf{94}_1$ and $\mathbf{94}_2$ when the ribbon cassette Rc is fitted to the printer block 71. As the thermal head 51 is displaced toward the platen 50 while the ribbon cassette Rc is fitted to the printer block 71, the thermal transfer ribbon 52 comes in contact with the platen 50 with the aid of the ribbon guides 73, as illustrated in FIG. 8. As will be readily understood, paper which is not shown in the drawing is interposed between the platen 50 and the thermal transfer ribbon 52 and ink on the thermal transfer ribbon 52 is transferred onto paper in the molten state by heating the thermal head 51 in response to image information.

Figure 12:
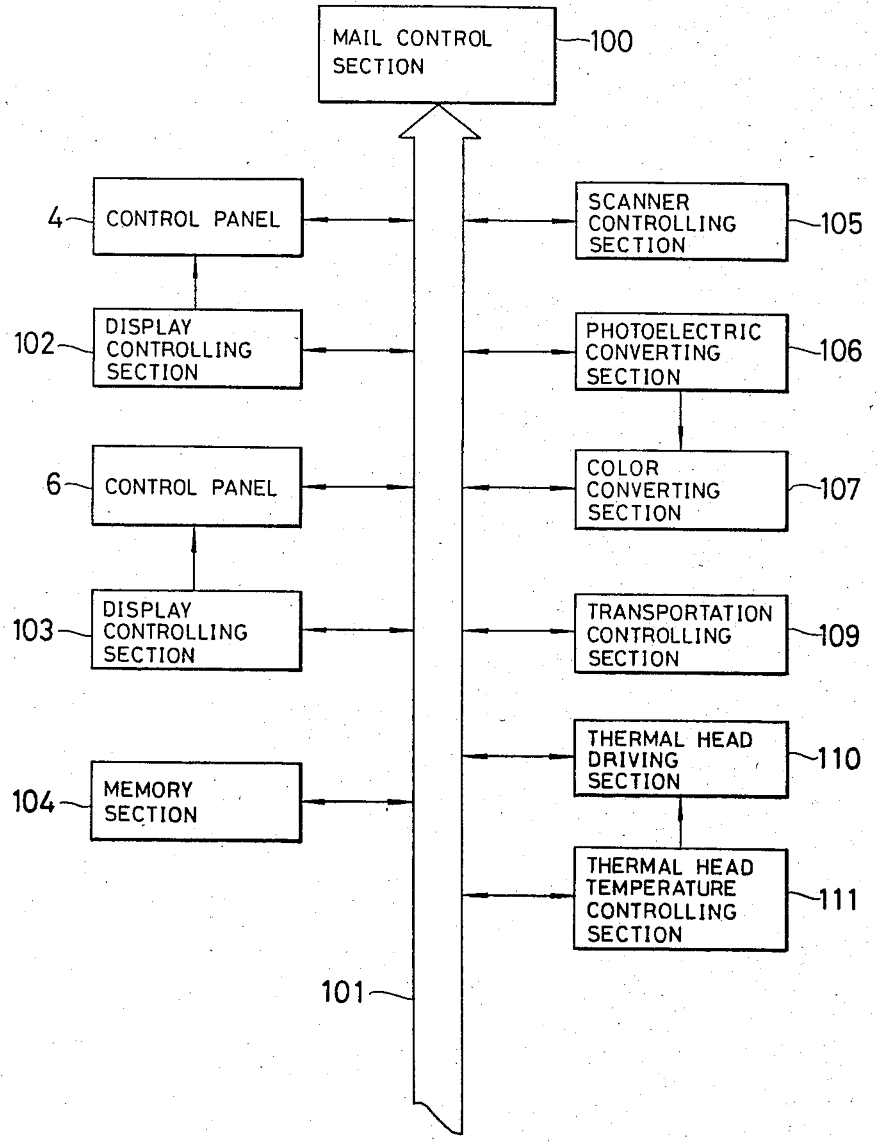
FIG. 12 is a block diagram schematically illustrating a control system for the apparatus.

FIG. 12 is a block diagram which schematically illustrates the whole control system for the apparatus. Specifically, a main control section 100 is constituted, for instance, by a combination of a central processing unit and associated components which are electrically connected to the former by way of a bus line 101. As is apparent from the drawing, electrically connected to the bus line 101 are provided a control panel 4 on the image information reading unit 2, a control panel 6 for the image building section 6, display controlling circuits 102 and 103 adapted to control both the control panels 4 and 6, a storing section 104, a scanner controlling section 105, a photoelectric converting section 106, a color converting section 107, a transportation controlling section 109, a thermal head driving section 110 and a thermal head temperature controlling section 111. The display controlling circuits 102 and 103 are activated in response to signals transmitted from the main control section 100 via the bus line 101 to control displays 48 and 10 on the control panels 4 and 6. Signals generated by handling the keys on the control panels 4 and 6 are transmitted to the main control section 100 via the bus line 101 so as to assure that required controlling is effected in response to thus generated signals. The storing section 104 is activated in response to signals transmitted from the main control section 100 via the bus line 101 so as to store ink color signals converted in the color converting section 107, read stores signals therefrom or for the like purpose.

On the other hands, the scanner controlling section 105 is activated in response to signals transmitted from the main control section via the bus line 101 so as to control the light sources 23 and the pulse motor 28 in the scanner section 21 and the photoelectric converting section 106. The photoelectric converting section 106 detects images on an original in response to signals transmitted from the main control section 106 via the bus line 101 so as to output light color signals which are modified in the digital form. The color converting section 107 converts light color signals outputted from the photoelectric converting section 106 into ink color signals for each of yellow, magenta, cyan and black so as to output thus converted color signals to the bus line 101. Further, the color converting section 107 is adapted to effect color converting also for signals delivered from the bus line 101 so that new signals are outputted to the bus line 101.

The transportation controlling section 109 is activated in response to signals transmitted from the bus line 101 so as to drive the motors 86 for rotating the platen 50, the motors 89 and 90 for rotating the cores 87 and 88 in the ribbon cassette Rc, motors for rotating the register rollers 55, the paper discharging rollers 65 and others and solenoid (not shown) for turning the first and second distributing gates 63 and 64. The thermal head driving section 110 is activated in response to signals transmitted from the main control section 100 via the bus line 101 as well as signals transmitted from the thermal head temperature controlling section 111 so as to control heating elements on the thermal head 51. Finally, the thermal head temperature controlling section 111 is activated in response to signals transmitted from the main control section 100 via the bus line 101 so as to output temperature controlling signals to the thermal head driving section 110.

Next, description will be made below as to characterizing features of the apparatus of the invention.

Figure 13:
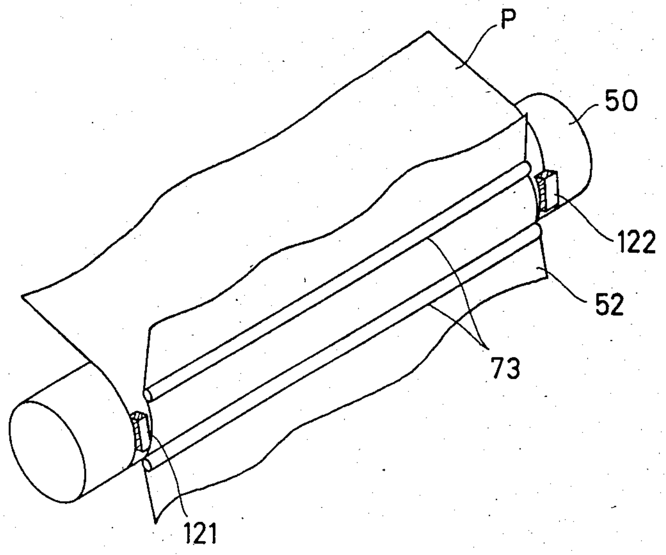
FIG. 13 is a fragmental perspective view of the image building section, particularly illustrating how retaining members are disposed relative to a sheet of paper.
Figure 14:
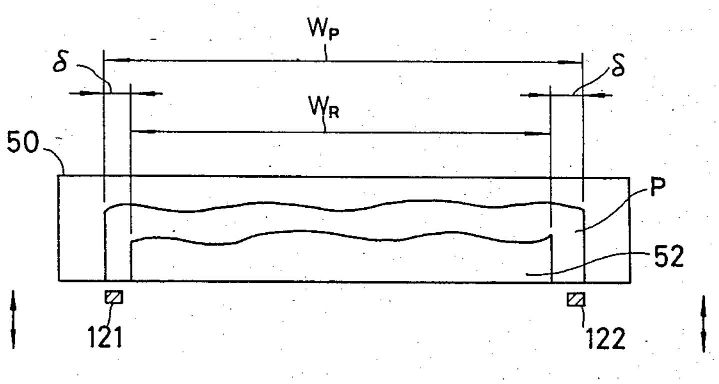
FIG. 14 is a fragmental plan view of the image building section, particularly illustrating the relation between paper and retaining members which are kept away from the former.
Figure 15:
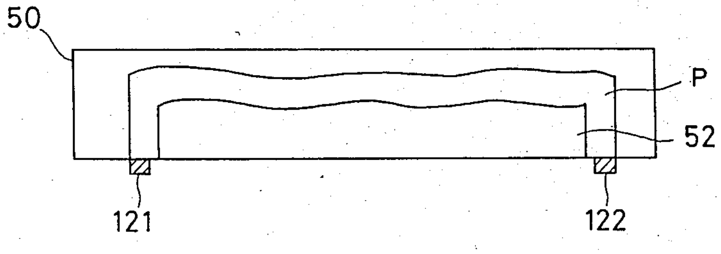
FIG. 15 is a fragmental plan view of the image building section similar to FIG. 14, particularly illustrating the relation between paper and retaining members which are brought in pressure contact with paper.
Figure 16:
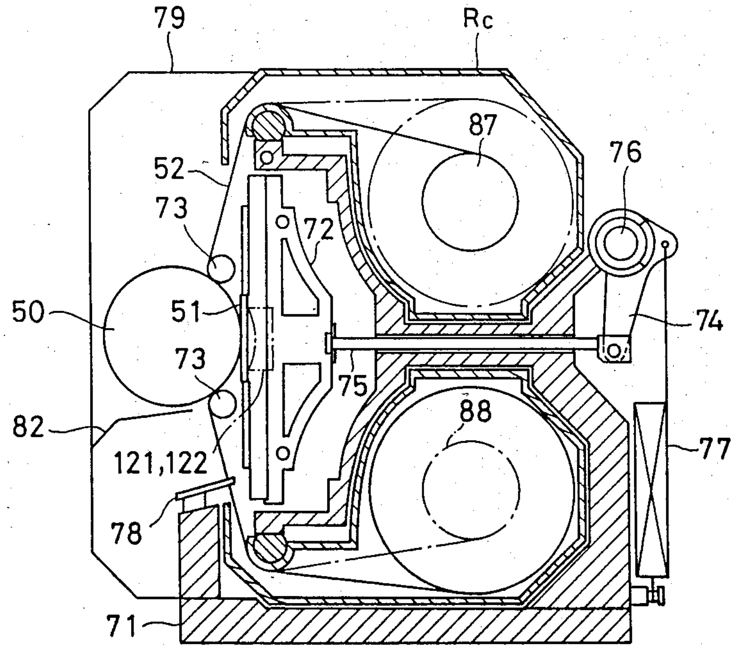
FIG. 16 is a vertical sectional view of the image building section, particularly illustrating how the retaining members are kept away from the platen while the printing head comes in contact with the platen.
Figure 17:
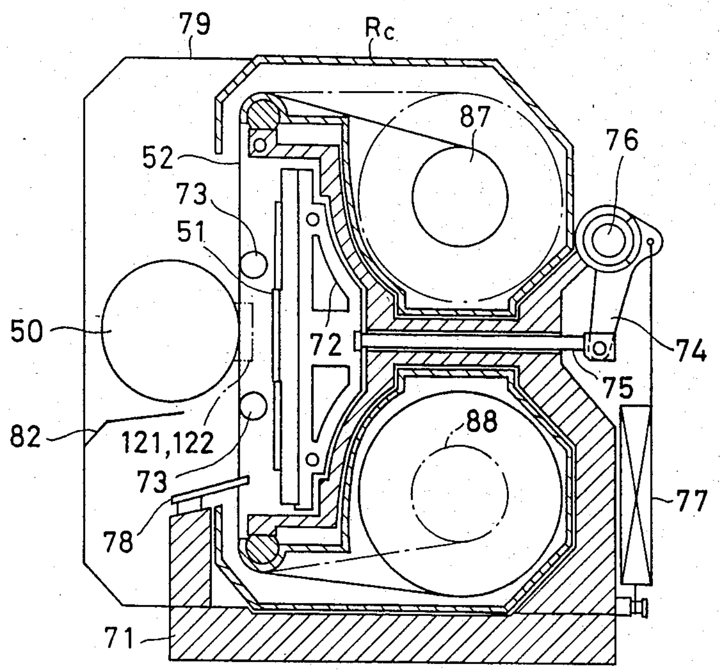
FIG. 17 is a vertical sectional view of the image building section, particularly illustrating how the retaining members come in contact with the platen while the printing head is displaced away from the platen.

As schematically illustrated in FIGS. 13 and 14, the width $W_R$ of thermal transfer ribbon 52 is fabricated to be narrower by a length of 2 $\delta$ than the width $W_P$ of paper P. Since the center line of thermal transfer ribbon 52 is correctly aligned with the center line of paper P as seen in the longitudinal direction, it results that both the end parts of paper P are exposed to the outside by a distance of $\delta$. Retaining members 121 and 122 are disposed by both the ends of the thermal transfer ribbon 52 as seen in the transverse direction in order to thrust both the end parts of paper P as seen in the transverse direction against the outer surface of the platen 50. The retaining members 121 and 122 are made of material having a high frictional coefficient such as rubber or the like material. To displace the retaining members 121 and 122 in both the directions as identified by arrow marks in FIG. 14 the thermal head 51 in the frame block 71 is provided with plungers or the like means (not shown) at both the side ends thereof. Typically, the plungers are actuated by activating the transportation controlling section 109 as illustrated in FIG. 12. When the thermal head 51 is brought in pressure contact with the platen 50 by activating the transportation controlling section 109, the retaining members 121 and 122 are parted away from the platen 50, as illustrated in FIGS. 14 and 16. On the other hand, when the thermal head 51 is displaced away from the platen 50, the retaining members 121 and 122 come in pressure contact with the platen 50 with the aid of the transportation controlling section 109 which is controlled for the intended purpose, as illustrated in FIGS. 15 and 17.

Next, description will be made below with reference to FIGS. 18 to 21 as to how the retaining members 121 and 122 are operated in association with thermal transference.

As described above, the apparatus of the invention is so constructed that paper P is reciprocably displaced to carry out thermal transference.

Figure 18:
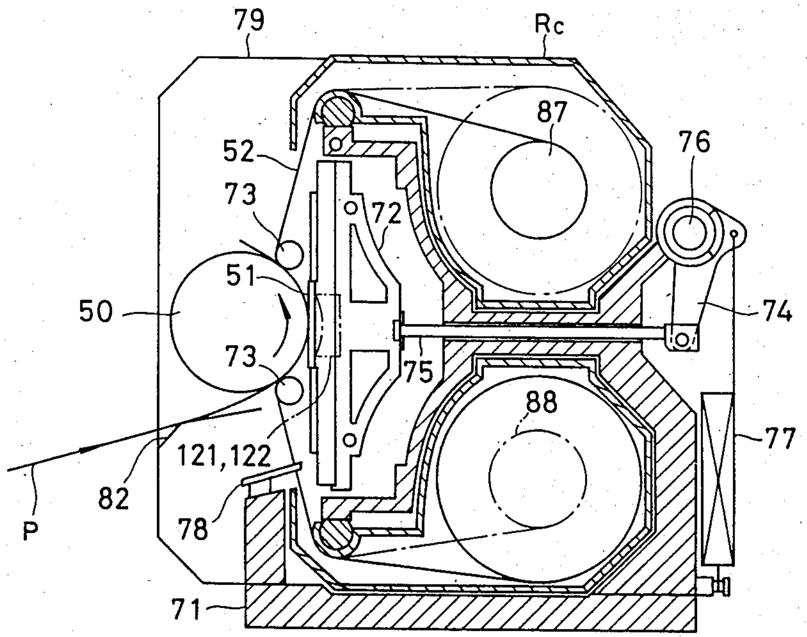
FIG. 18 is a vertical sectional view of the image building section, particularly illustrating how paper is partially wound about the platen while the retaining members are kept away from the platen and the printing head comes in contact therewith.

During paper feeding the thermal head 51 is brought in pressure contact with the platen 50 with the thermal transfer ribbon 52 interposed therebetween. At this moment the retaining members 121 and 122 are kept away from the platen, as illustrated in FIG. 18. While the above-mentioned positional state is maintained, paper P taken from the paper feeding cassette 13 is brought into the area between the platen 50 and the thermal transfer ribbon 52 via the pair of register rollers 55 and the first distributing gate 63 (see FIG. 4) as the platen 50 is rotated and the thermal transfer ribbon 52 runs. When paper P reaches the predetermined position, transferring operation is initiated. It should be noted that movement of both the thermal transfer ribbon 52 and the paper A is so controlled that the foremost end of the first ink section is aligned with the leading end of the paper A.

Figure 19:
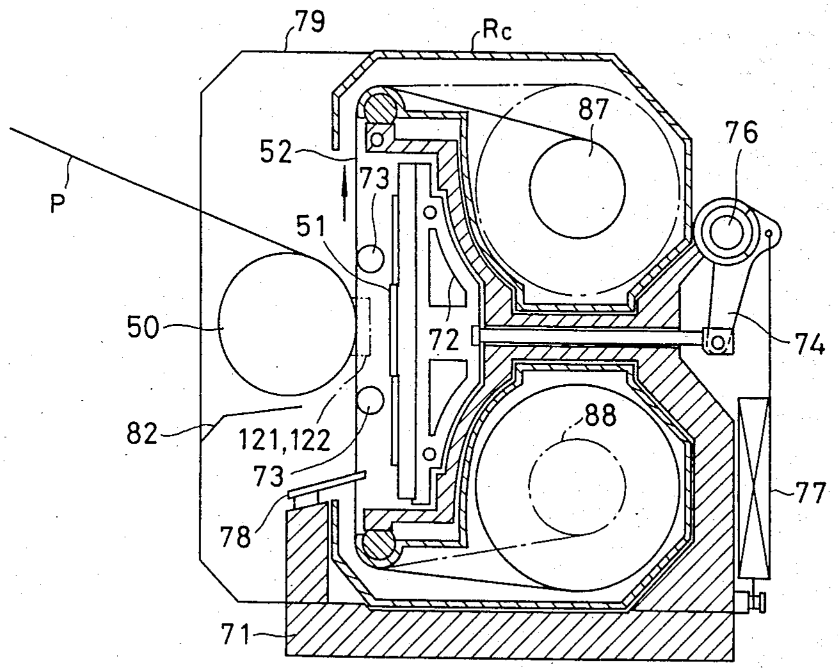
FIG. 19 is a vertical sectional view of the image building section, particularly illustrating how the tail end of paper is immovably held by means of the retaining members while the thermal transfer ribbon is caused to run with the printing head displaced away from the platen.

On completion of thermal transferring of a first color, the platen 50 is caused to stop its rotation and both the retaining members 121 and 122 are brought in pressure contact with the platen 50 so as to depress the tail end of paper A, and at this moment, the thermal head 51 is kept away from the platen 50, as illustrated in FIG. 19. While the above-mentioned positional state is maintained, the thermal transfer ribbon 52 is caused to run in the direction as identified by an arrow mark in the drawing (in the normal direction) until the rearmost end of the second ink section is aligned with the tail end of paper P.

Figure 20:
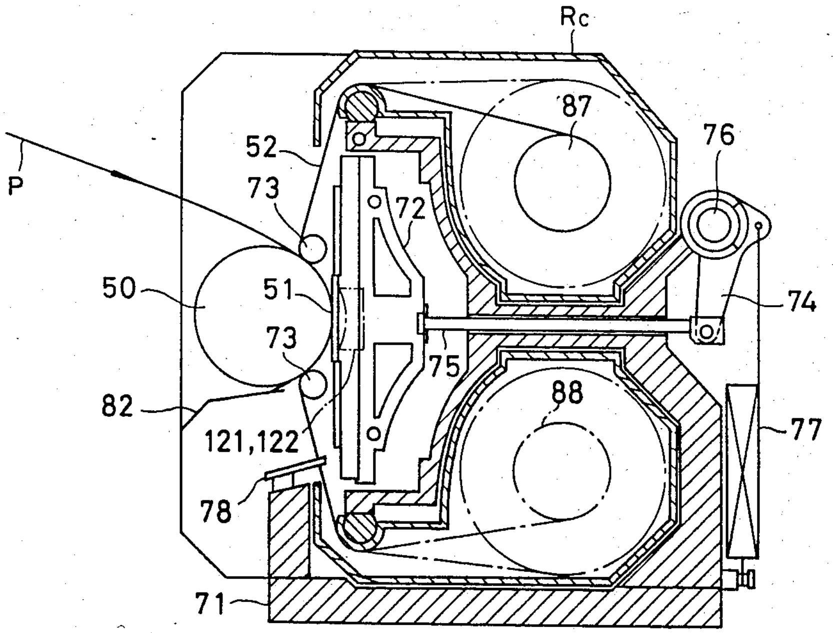
FIG. 20 is a vertical sectional view of the image building section, particularly illustrating how paper is partially wound about the platen while the retaining members are brought in pressure contact with the platen with the printing head displaced away therefrom.
Figure 21:
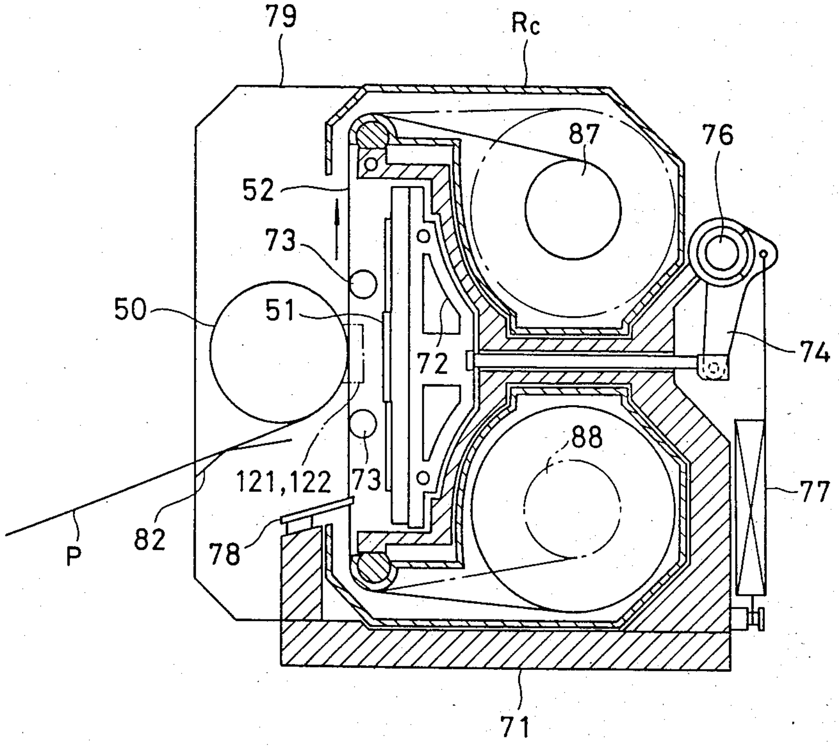
FIG. 21 is a vertical sectional view of the image building section, particularly illustrating how the leading end of paper is immovably held by means of the retaining members while the thermal transfer ribbon is caused to run with the printing head displaced away from the platen.

When the tail end of paper P is correctly aligned with the rearmost end of the ink section, the thermal head 51 is brought in pressure contact with the platen 50 with the thermal transfer ribbon 52 interposed therebetween and at the same time the retaining members 121 and 122 are parted away from the platen, as illustrated in FIG. 20. While the above-mentioned positional state is maintained, the platen 50 is rotated in the reverse direction and the thermal transfer ribbon 52 is caused to run in the reverse direction. Thus, paper P is transported in the reverse direction together with the thermal transfer ribbon 52 whereby thermal transferring is effected in the reverse direction. At this moment image informations thus transferred in the reverse direction are read from the storing section 104 (see FIG. 12) in the reverse direction.

On completion of thermal transferring in the reverse direction the platen 50 is caused to stop its rotation and the retaining members 121 and 122 are brought in pressure contact with the platen 50 to immovably hold the leading end of paper P thereby. At the same time the thermal head 51 is displaced away from the platen 50. While the above-mentioned positional state is maintained, the thermal transfer ribbon 52 is caused to run in the direction as identified by an arrow mark in the drawing (in the normal direction) and the foremost end of the third ink section is aligned with the leading end of paper P. When the leading end of paper P is correctly aligned with the foremost end of the ink section, the thermal head 51 is brought in pressure contact with the platen with the thermal transfer ribbon 52 interposed therebetween and the retaining members 121 and 122 are kept away from the platen 50 whereby third thermal transference is achieved. In the case where the thermal transfer ribbon 52 is constituted by a combination of three ink sections of which color is different from one another, paper P is discharged from the apparatus immediately after completion of final thermal transference. Thus, the required thermal transferring operation is completed. In the case where the thermal transfer ribbon 52 is constituted by a combination of four ink sections of which color is different from one another, the platen 50 is rotated in the normal direction after completion of thermal transferring of the fourth ink section, as illustrated in FIGS. 19 and 20, whereby paper P is discharged from the apparatus. At this moment the thermal transfer ribbon 52 is caused to run in the normal direction in order to assure that next thermal transferring is effected again with the first ink section.

As described above, the apparatus of the invention is so constructed that the width of thermal transfer ribbon 52 is determined appreciably narrower than the width of paper P and both the end parts of paper P as seen in the transverse direction are immovably thrusted against the platen by means of retaining members 121 and 122 disposed at both the ends of the thermal transfer ribbon 52 as seen in the transverse direction. By virtue of construction of the apparatus made in that way it becomes possible that it is simpler in structure than the conventional apparatus in which paper P is immovably held with the use of roller means and moreover it is designed in smaller dimensions.

Another advantageous features of the apparatus of the invention are that a distance of movement of paper P can be reduced and incorrect displacement of paper P from the predetermined position can be minimized, since thermal transference is achieved by reciprocable movement of both the thermal transfer ribbon and paper.

While the present invention has been described above with respect to a single preferred embodiment, it should of course be understood that it should not be limited only to this but various changes or modifications may be made without departure from the spirit and scope of the invention as defined by the appended claims. For example, in the above embodiment, it is described that the ink on the ink ribbon has a heat fusable property and the ink becomes semi-fused by the heat from the thermal head. However, ink having a heat sublimiting property may also be employed.

What is claimed is:

1. An image forming apparatus comprising:

a platen for transporting a sheet of printing medium while the latter is partially wound about said platen, a strip of ink donor medium having a width less than the width of the printing medium, ink donor supporting and transporting means for supporting and transporting the ink donor medium which is spanned between a pair of cores while both end parts of the printing medium as seen in a transverse direction, which is essentially perpendicular to the transport direction of said printing medium and of said ink donor supporting and transporting means, are exposed outside of said ink donor medium when the ink donor medium is brought in contact with the printing medium, a printing head adopted to be displaced toward and away from the platen to thermally transfer at least one coloring agent on the ink donor medium to the printing medium when said printing head and the printing medium come in pressure contact with the platen with the ink donor medium interposed therebetween;

a pair of retaining members disposed at said both ends of the printing medium as seen in said transverse direction to thrust the exposed ends of the printing medium against the platen under the effect of a thrusting force given by said retaining members, and driving means for displacing said retaining members toward and away from said platen.

2. An image forming apparatus as defined in claim 1, wherein said driving means is so constructed that the retaining members are displaced away from the platen when an ink transferring operation is performed from said ink donor medium to said printing medium while the printing head comes in pressure contact with the platen with the ink donor medium and the printing medium interposed therebetween, and said retaining members are brought in pressure contact with the platen with the printing medium interposed therebetween when the printing head is displaced away from the platen.

3. An image forming apparatus as defined in claim 2, wherein said ink donor medium includes a plurality of coloring agent sections of different color juxtaposed one after another in the transporting direction of said ink donor medium, each of said coloring agent sections having a predetermined length in the transporting direction, and wherein positional alignment is achieved between the printing medium and each of the coloring agent sections of the ink donor medium by transporting said ink donor medium a distance of said length of the coloring agent section with the aid of the ink donor medium supporting and transporting means while said retaining members are brought in pressure contact with the platen with the printing medium interposed therebetween.

4. An image forming apparatus as defined in claim 1, wherein said ink donor medium supporting and transporting means is constructed in the form of a cassette which can be fitted into and removed from the housing of the apparatus.

5. An image forming apparatus as defined in claim 1, wherein said retaining members are made of material having a high frictional coefficient.

6. An image forming apparatus as defined in claim 1, wherein said retaining members are made of rubber or the like material.

7. An image forming apparatus as defined in claim 1, wherein said printing head is a thermal printing head and said ink donor medium is a sheet material on which coloring agents having a heat fusable or heat sublimating property are coated.

* * * * *